United States Patent [19]

Ogale

[11] Patent Number: 5,538,804
[45] Date of Patent: Jul. 23, 1996

[54] PROPYLENE POLYMER FILMS AND LAMINATES

[75] Inventor: Kumar Ogale, West Chester, Pa.

[73] Assignee: Montell North America Inc., Wilmington, Del.

[21] Appl. No.: 437,249

[22] Filed: May 8, 1995

Related U.S. Application Data

[63] Continuation of Ser. No. 830,540, Feb. 3, 1992, abandoned, which is a continuation of Ser. No. 609,305, Nov. 1, 1990, abandoned.

[51] Int. Cl.$^6$ ..................................................... B32B 27/08
[52] U.S. Cl. ........................ 428/515; 428/500; 428/516; 428/517; 525/240
[58] Field of Search ................................ 428/515, 500, 428/516, 517; 525/240

[56] References Cited

U.S. PATENT DOCUMENTS

| | | | |
|---|---|---|---|
| 4,211,852 | 7/1980 | Matsuda et al. | |
| 4,302,504 | 11/1981 | Lansbury et al. | |
| 4,395,519 | 7/1983 | Minami et al. | |
| 4,433,110 | 2/1984 | Baba et al. | 525/323 |
| 4,565,738 | 1/1986 | Purdy. | |
| 4,643,928 | 2/1987 | Kimura et al. | |
| 4,643,945 | 2/1987 | Kiang. | |
| 4,725,505 | 2/1988 | Hwo | 428/516 |
| 4,740,421 | 4/1988 | Suzuki et al. | 428/349 |
| 4,766,178 | 8/1988 | Hwo | 525/240 |
| 4,769,421 | 9/1988 | Hwo | 525/240 |
| 4,822,840 | 4/1989 | Kioka et al. | 525/240 |
| 4,883,698 | 11/1989 | Bothe et al. | 428/516 |
| 4,923,722 | 5/1990 | Kondo et al. | 428/516 |

FOREIGN PATENT DOCUMENTS 324250 7/1989 European Pat. Off. .

*Primary Examiner*—Shelley A. Dodson
*Assistant Examiner*—Duc Truong

[57] ABSTRACT

Disclosed are films or sheets comprising a crystalline propylene polymer composition which is comprised of, by weight, (A) from about 30 to 65% of a copolymer of propylene with a $C_{4-8}$ alpha-olefin containing from 80 to 98% propylene, and (B) 35-70% of a co- or terpolymer of propylene with ethylene and, optionally, a $C_{4-8}$ alpha-olefin having an ethylene content of 5 to 10% when ethylene is the sole comonomer and an ethylene content of 0.5 to 5% and a $C_{4-8}$ alpha-olefin content of 1 to 9.5% when both ethylene and a $C_{4-8}$ alpha-olefin are used as comonomers.

Coextruded films or sheets and laminates wherein at least one layer is a film or sheet as described above, and films or sheets of blends of the propylene polymer composition and an olefin polymer are also disclosed.

20 Claims, No Drawings

PROPYLENE POLYMER FILMS AND LAMINATES

This application is a continuation of application Ser. No. 07/830,540, filed Feb. 3, 1992, which is a continuation of 07/609,305, filed Nov. 1, 1990, now abandoned.

FIELD OF THE INVENTION

This invention relates to weldable thermoplastic films or sheets of a propylene polymer composition, to laminates and coextruded materials formed therefrom, and to films and sheets formed from blends of the propylene polymer composition with thermoplastic polymer materials.

BACKGROUND OF THE INVENTION

In many film applications, such as packaging of foodstuffs, chemical and hazardous materials and in medical applications, the industry requires films having certain properties. In the packaging of foodstuffs, for example, the films must have high puncture resistance, high clarity and gloss, reduced permeability to gases and/or vapors and good weld strength. The films used to manufacture containers for chemicals and hazardous materials must have a high puncture resistance, high elongation strength, high tear resistance, chemical resistance and good weld strength. Films used in medical applications, such as blood bags, must have a high puncture resistance, low modulus, high tear resistance, autoclavability and good weld strength.

Films made from ethylene polymers, e.g., HDPE and LLDPE, and propylene polymers, such as crystalline homopolymers of propylene and random copolymers of propylene and ethylene do not provide such a combination of desirable properties.

Crystalline random copolymers of propylene and ethylene are frequently used to prepare such films because of the inherent clarity of such copolymers. However, films prepared from crystalline copolymers of propylene and less than 3% ethylene or blends thereof with other olefin polymers do not provide good seals or weld strength since the melting point of these copolymers or blends thereof is too close to the melting point of the base polymer layer they are laminated to or coextruded with, which is typically a crystalline homopolymer of propylene. Further the resulting laminate or coextruded material lacks dimensional integrity or stability.

When films are prepared from crystalline random copolymers of propylene and ethylene having about 5–6% ethylene, the melting point of said copolymer is decreased with respect to the melting point of the crystalline homopolymers of propylene so that such a copolymer film does have certain weldability properties. However, the insertion of the comonomer disrupts the crystalline structure with the concomitant formation of an increased fraction of xylene soluble polymer at room temperature. Consequently, the mechanical properties of films formed from such a copolymer are adversely affected. Furthermore, the presence of a high xylene soluble polymer fraction renders the film material susceptible to attack from organic substances and, therefore, unsuited for use in food packaging. Films prepared from blends of such crystalline copolymers of propylene with other polymers do not overcome these disadvantages.

Therefore, there is a need for a film or sheet material having a low seal initiation temperature as well as other desirable properties comprising a propylene polymer material having a low xylene soluble polymer fraction at room temperature and weldability.

All parts and percentages used in this application are by weight unless otherwise specified. Ambient or room temperature is approximately 25° C.

SUMMARY OF THE INVENTION

This invention provides a film or sheet material having the desired properties comprising a crystalline propylene polymer composition which is comprised of, by weight, (A) from about 30 to 65% of a copolymer of propylene with a $C_{4-8}$ alpha-olefin containing from 80 to 98% propylene, and (B) 35–70% of a co- or terpolymer of propylene with ethylene and, optionally, a $C_{4-8}$ alpha-olefin having an ethylene content of 5 to 10% when ethylene is the sole comonomer and an ethylene content of 0.5 to 5% and a $C_{4-8}$ alpha-olefin content of 1 to 9.5% when both ethylene and a $C_{4-8}$ alpha-olefin are used as comonomers, wherein the total content of the two comonomers is from 2 to 10%. The total of (A) and (B) equals 100%.

In another embodiment this invention provides films or sheets comprising a layer of the propylene polymer composition applied to at least one surface of a thermoplastic film material or a metallic substrate.

In yet another embodiment films or sheets from blends of the propylene polymer composition and a thermoplastic polymer material are provided.

DETAILED DESCRIPTION OF THE INVENTION

Component (A) is preferably present in an amount from 35 to 65%, most preferably from 45 to 65%. The propylene content of component (A) is preferably from 85 to 95%.

Component (B) is preferably present in an amount from 35 to 65%, most preferably from 35 to 55%. When component (B) is a terpolymer the total comonomer content, i.e. of ethylene and a $C_{4-8}$ alpha-olefin is from 2 to 10% preferably 3 to 6%, and the ethylene content is preferably from 1 to 3%. When component (B) is a copolymer, ethylene is preferably present in an amount from 7 to 9%.

The $C_4$–$C_8$ alpha-olefin useful in the preparation of the components of the propylene polymer composition include butene-1, pentene-1, hexene-1, 4-methypentene-1 and octene-1. Butene-1 is particularly preferred.

The preferred films or sheets are those prepared from propylene polymer compositions in which no $C_{4-8}$ alpha-olefin is present in component (B).

The propylene polymer composition useful in the preparation of the films or sheets of this invention has a melting point from about 125° to 140° C., a xylene soluble polymer fraction at ambient temperature of less than 20%, preferably less than 15%, more preferably less than 10% by weight, and a n-hexene soluble polymer fraction at 50° C. of less than 5.5%.

The films or sheets made from such compositions have a seal initiation temperature (as defined hereinafter) from 100° to 110° C. Seal initiation temperature (S.I.T.) is the minimum seal temperature at which a weld made in a multilayered film having a polypropylene film layer and a film layer of the propylene polymer composition as described in this application, does not break when a load of 300 g is applied to the multilayered film. The details will be given in the examples.

The propylene polymer compositions useful in producing the films or sheets of this invention are prepared by the sequential polymerization of the relevant monomers in the presence of a stereospecific Ziegler-Natta catalyst system having a solid catalyst component supported on a magnesium dihalide in active form. It is essential that such solid catalyst component comprise a titanium compound having at least one halogen-titanium bond, and an electron donor compound supported on the magnesium dihalide in active form. Such catalyst systems useful in preparing the propylene polymer composition are characterized by the fact that they produce polypropylene with an isotactic index higher than 90%, preferably higher than 95%, under optimum conditions. Catalyst systems having such characteristics are well known in the patent literature. Particularly advantageous are the catalyst systems described in U.S. Pat. Nos. 4,339,054, 4,472,524 and 4,473,660 and European Patent No. 45,977.

The solid catalyst components used in these catalyst systems include, as electron donor compounds, ethers, ketones, lactones; compounds containing atoms of N, P and/or S, and esters of mono- and dicarboxylic acids. Particularly useful as electron donors are the esters of phthalic acid, such as diisobutyl-, dioctyl- and diphenylphthalate, and benzylbutylphthalate; the esters of malonic acid, such as diisobutyl- and diethylmalonate; alkyl maleates; alkyl and aryl carbonates, such as diisobutyl carbonate, ethylphenyl carbonate and diphenyl carbonate; and succinic acid esters, such as mono and diethyl succinate.

Other particularly suited electron donors are the ether compounds having the formula

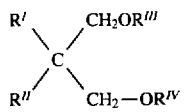

where $R^I$ and, $R^{II}$, are the same or different from each other, and are $C_{1-18}$ straight or branched alkyl, $C_{5-18}$ cycloalkyl or $C_{6-18}$ aryl radicals; $R^{III}$ and $R^{IV}$ are the same or different, and are $C_{1-4}$ straight or branched alkyl radicals. Typical ethers of this type and methods of preparing same are described in the U.S. application, Ser. No. 413,409, filed Sep. 27, 1989, the disclosure of which is incorporated herein by reference. Examples of such ether compounds include 2-methyl-2-isopropyl-1,3-dimethoxypropane, 2,2-diisobutyl-1,3-dimethoxypropane and 2-isopropyl-2-cyclopentyl-1,3-dimethoxypropane.

The supported catalyst component can be prepared by milling a conventional anhydrous magnesium dihalide, i.e. an unactivated magnesium dihalide containing less than 1% water, the titanium compound and an electron donor compound under conditions which cause activation of the magnesium dihalide. The milled product is then treated one or more times with an excess of $TiCl_4$ at a temperature from 90° to 135° C. and washed repeatedly with a hydrocarbon (e.g. hexane) until all chlorine ions have disappeared from the wash.

Alternatively, the anhydrous magnesium halide is preactivated using known methods and then treated with an excess of $TiCl_4$ containing an electron donor compound in solution at a temperature between 80 and 135° C. The treatment with $TiCl_4$ is then repeated, and the solid is then washed with hexane or other suitable hydrocarbon solvent to eliminate all traces of unreacted $TiCl_4$. The magnesium dihalide compound or a complex thereof may be formed in situ from a magnesium compound capable of forming same upon treatment with a halide-containing titanium compound which is preferably $TiCl_4$.

In another method, the solid catalyst support may be prepared by forming an adduct, preferably in spherical particle form, of magnesium dichloride and an alcohol, such as ethanol, propanol, butanol, isobutanol and 2-ethyl-hexanol, wherein the molar ratio is 1:1 to 1:3, which then is treated with an excess of $TiCl_4$ containing an electron donor in solution. The temperature ranges generally between 80 and 120° C. The solid is isolated and treated again with $TiCl_4$. The solid is separated and washed with a hydrocarbon until all chlorine ions have disappeared from the wash.

In yet another method, alkoxy magnesium compounds and alkoxy magnesium chloride compounds (the alkoxy magnesium chloride compounds being prepared according to the method described in U.S. Pat. No. 4,220,554, the disclosure of said method being incorporated herein by reference), are treated with an excess of $TiCl_4$ containing an electron donor compound in solution, under the reaction conditions described above.

In the solid catalyst component, the Ti compound, expressed as Ti, is generally present in an amount from 0.5 to 10% by weight; and the amount of electron donor compound fixed on the solid counterpart (inside donor) is generally from 5 to 20 mole % with respect to the magnesium dihalide. Useful titanium compounds for the preparation of the solid catalyst component are the halides and the alkoxy halides of titanium. Titanium tetrachloride is the preferred compound. Satisfactory results are obtained also with titanium trihalides and with alkoxy halides of titanium, such as $TiCl_3$ OR where R is a phenyl radical.

In addition to the above reactions which result in the formation of magnesium dihalides in active form, there are other reactions known in the literature which result in the formation of magnesium dihalide in active form from magnesium compounds other than the halides, such as alkoxy magnesium compounds and magnesium carbonate.

The active form of the magnesium dihalide in the solid catalyst component is evidenced in the X-ray spectrum of the solid catalyst component by the absence of the high intensity diffraction line which appears in the X-ray spectrum of the unactivated magnesium dihalide (having a surface area less than 3 $m^2/g$) and instead there is a halo with the maximum intensity shifted with respect to the position of the high intensity diffraction line of the unactivated magnesium dihalide, or by the fact that said high intensity diffraction line shows a broadening having a half peak breadth at least 30% greater than the one of the high intensity diffraction line of the unactivated magnesium dihalide. The most active forms are those in which the aforementioned halo appears in the X-ray spectrum of the solid catalyst component.

Magnesium dichloride is the preferred compound. In the case of the most active forms of magnesium dichloride, the X-ray spectrum of the solid catalyst component shows a halo, instead of the diffraction line which appears in the X-ray spectrum of the unactivated magnesium dichloride, at a distance of 2.56 angstroms. The Al-alkyl compounds useful as cocatalysts include Al-trialkyls, such as Al-triethyl, Al-triisopropyl and Al-triisobutyl; Al-dialkyl ($C_{1-6}$ alkyl) hydrides, such as Al-diethyl hydride; and compounds containing two or more Al atoms linked to each other through oxygen, nitrogen and/or sulfur heteroatoms, such as:

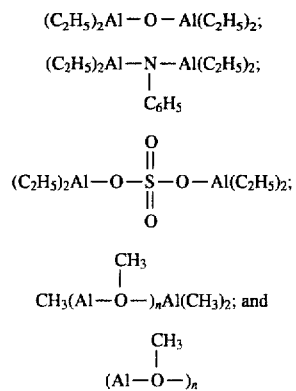

where n is a number between 1 and 20. Preferably, the Al-alkyl compound is Al-triethyl (TEAL). Moreover, one can use $AlR_2OR'$, where R' is an aryl radical substituted in one or two positions with a $C_{1-6}$ alkyl, and R is a $C_{1-6}$ alkyl radical.

The Al-alkyl compound is generally used in an amount such that the Al/Ti ratios are from 1 to 1000.

The electron donor compounds that can be used as electron donors with the Al-alkyl compound cocatalyst include aromatic acid esters, such as alkyl benzoates, and organosilane compounds. Typical organosilane compounds are those having Si—OR, Si—OCOR or Si—$NR_2$ bonds, where R is $C_{1-20}$ alkyl, $C_{2-20}$ alkenyl, $C_{6-20}$ aryl, $C_{7-20}$ arylalkyl or $C_{5-20}$ cycloalkyl and Si (IV) as the central atom. Such compounds are described in U.S. Pat. Nos. 4,472,524, 4,522,930, 4,560,671, 4,581,342, 4,657,882 and European Patent Applications 45976 and 45977. Suitable organosilane compounds include $(t-butyl)_2Si(OCH_3)_2$, $(cyclohexyl)_2Si(OCH_3)_2$, $(phenyl)_2Si(OCH_3)_2$.

The 1,3-diethers having the formula set forth herein above may also be used advantageously. If the inside donor is one of these diethers, the outside donor can be absent.

The polymerization of the relevant monomers is conducted in at least two stages such that the components (A) and (B) are prepared in separate stages, operating in each subsequent stage in the presence of the polymer and the catalyst used in the preceding stage, i.e., no additional catalyst is added in the second stage.

For example, component (B) can be prepared in one stage and component (A) in a subsequent stage. The order in which components (A) and (B) are prepared is not critical.

The polymerization reactions may be conducted by batch or continuously, following known techniques, and are carried out in an inert atmosphere in the presence of liquid or gaseous monomer or combinations thereof and, optionally, in the presence of an inert hydrocarbon solvent, at a temperature generally from about 20° to about 100° C., preferably from 50° to 80° C., and at a pressure generally from about atmospheric to about 1000 psi, preferably from about 200 to 500 psi in liquid phase polymerization and typically from atmospheric to about 600 psi in gas phase polymerization. Gas phase polymerization is preferred. Typical residence times are from about 15 minutes to about 6 hours.

Hydrogen can be added as needed as a chain transfer agent for reduction in the molecular weight of the polymer.

The catalysts may be precontacted with small quantities of relevant olefin monomers (prepolymerization), maintaining the catalyst in suspension in a hydrocarbon solvent and polymerizing at a temperature of 60° C. or below for a time sufficient to produce a quantity of polymer from 0.5 to 3 times the weight of the catalyst. Prepolymerization also can be done in liquid or gaseous monomer to produce, in this case, a quantity of polymer up to 1000 times the catalyst weight.

Since the components (A) and (B) are prepared directly in the polymerization, the resultant propylene polymer compositions are in the form of as-polymerized particles. In said particles the components (A) and (B) are optimally mixed so that the resulting propylene polymer compositions are directly employable for the production of films without resorting to post polymerization treatments, such as granulation.

The preferred propylene polymer compositions are in the form of spherical or spheroidal particles having diameters from 0.5 to 4.5 mm and more preferably with a narrow granulometric distribution wherein at least 90% of the particles have diameters from 0.5 to 3.5 mm. Such particles are obtainable, for instance, by using the catalyst systems disclosed in U.S. Pat. No. 4,472,524, the disclosures of which are incorporated herein by reference.

Preparation of the Solid Catalyst Component

A) Preparation of $MgCl_2$/Alcohol Adduct

Forty-eight g of anhydrous magnesium chloride, 77 g of anhydrous ethyl alcohol and 830 ml of kerosene are charged under an inert gas atmosphere and at room temperature, into a 2 liter heating vessel fitted with a turbine powered stirrer and an outlet pipe. The ingredients are then heated to 120° C. with agitation, whereby an adduct of $MgCl_2$ and the alcohol is formed, which adduct melted and remained mixed with the dispersant. A nitrogen gas pressure of 15 kg/cm² is maintained in the vessel. The outlet pipe of the vessel is heated externally by a heating sleeve to 120° C. The outlet pipe has an inner diameter of 1 mm and a length of 3 meters through the heating sleeve. The mixture is allowed to flow through the pipe at a speed of about 7 m./sec. At the outlet of the pipe the dispersion is discharged into a 5 liter vessel fitted with a stirrer and containing 2.5 l of kerosene, and the vessel is cooled externally in a chamber which is maintained at the initial temperature of −40° C. The final temperature of the emulsion discharged into the vessel is 0° C. The spheroidal solid product forms the dispersed phase of the emulsion, and is separated by decanting and filtering, washing with heptane and drying. All of the foregoing operations are carried out under an atmosphere of an inert gas.

A $MgCl_2·3C_2H_5OH$ is obtained (130 g) in the form of solid spheroidal particles having a maximum diameter of less than 50 microns. The solid product, after drying under vacuum for 2 hours, weighed 105 g. The solid product is then heated, under nitrogen gas flow, to a temperature of about 60° C. to partially dealcoholate the spherical particulate adduct for a period of time sufficient to reduce the alcohol content in the adduct by about ⅓. The resulting adduct is $MgCl_2·2·1C_2H_5OH$.

B) Solid Catalyst Component Preparation

In a 1 liter glass flask equipped with a condenser, mechanical agitator and thermometer, 625 ml of $TiCl_4$ are introduced under an anhydrous nitrogen atmosphere. While agitating at 0° C. 25 g of the $MgCl_2·2·1C_2H_5OH$ adduct are fed into the flask. The ingredients are heated to 100° C. in 1 hour. When the temperature reaches 40° C., 9 mmoles of diisobutyl-phthalate is introduced. The reaction mixture is maintained at 100° C. for 2 hours and is allowed to settle. The supernatant liquid is then syphoned off. 550 ml of $TiCl_4$ is added to the solids and heated to 120° C. for 1 hour. The reaction mixture is allowed to settle and the supernatant is syphoned off. The solid residue is washed 6 times with 200 cc aliquots of anhydrous hexane at 60° C. and 3 times at room temperature.

EXAMPLES 1-2

These examples illustrate the propylene polymer composition and a method for preparing same.

General Operating Conditions

The preparations for polymerization and the polymerization runs were conducted under nitrogen in a series of reactors with a means for transferring the product produced in the immediately preceding reactor to the next reactor. All temperatures, pressures and concentrations of olefin monomers and hydrogen, when present, were constant unless otherwise indicated. The concentration of hydrogen and of the relative monomers is analyzed continuously in gas phase with a process gas chromatograph and fed in order to maintain constant the desired concentration of same.

In these examples, a mixture of TEAL activator and dicyclohexyldimethoxysilane electron donor, in an amount such that the weight ratio of TEAL:silane is about 6.5, are contacted with an amount of the solid catalyst component, such that the molar ratio of TEAL:Ti is about 65, in a reactor at 5° C. for about 15 minutes. The catalyst is then transferred to another reactor containing an excess of liquid propylene and the propylene is prepolymerized for 3 minutes at 20° C.

In the first stage, the prepolymer is transferred to another reactor for a gas phase polymerization of the relevant monomers to form the fraction (B) in example 1 and the fraction (A) in example 2. In the second stage, the product of the immediately preceding reactor is fed, after degassing the unreacted monomers, to the second gas phase reactor for the polymerization of the relevant monomers to form the other of the two components (A) or (B), as the case may be. At the end of the second stage polymerization reaction, the polymer product is discharged into a steaming apparatus and the unreacted monomers and volatiles are removed by treating with steam at 105° C. at atmospheric pressure for about 10 minutes and then dried.

The ingredients and relative operating conditions are set forth in Table 1A, and the test results relative to components (A) and (B) and to the final propylene polymer compositions are reported in Table 1B. With reference to Table 1B, the following analytical methods were employed.

| Analytical Methods | |
|---|---|
| Properties | Method |
| Ethylene, wt % | I.R. spectroscopy |
| Butene-1, wt % | I.R. spectroscopy |
| Melting point | DSC |
| Melt Index | ASTM-D 1238, Condition L |
| Intrinsic Viscosity (I.V.) | Determined in tetrahydronaphthalene at 135° C. |
| Xylene soluble fraction, wt % | Determined by solubilizing a sample of material in xylene at 125° C. and cooling the solution to room temperature. The soluble and insoluble fractions are separated by filtration. |
| Hexane soluble fraction, wt % | A film of the composition 100 microns thick is subjected to extraction in n-hexene in an autoclave at 50° C. for 2 hours, the n-hexene is then evaporated and the dry residue weighed. |

TABLE 1A

| | Examples | |
|---|---|---|
| | 1 | 2 |
| FIRST GAS PHASE REACTOR | | |
| Temperature, °C. | 65 | 65 |
| Pressure, atm. | 17 | 17 |
| Residence time, min. | 75 | 75 |
| $H_2/C_3$, mol % | 0.003 | 0.035 |
| $H_2/C_2$, mol % | 0.151 | - |
| $C_2/C_2 + C_3$, mol % | 0.023 | - |
| $C_4/C_4 + C_3$, mol % | 0.044 | 0.178 |
| SECOND GAS PHASE REACTOR | | |
| Temperature, °C. | 70 | 70 |
| Pressure, atm. | 17 | 20 |
| Residence time, min. | 45 | 45 |
| $H_2/C_3$, mol % | 0.005 | 0.025 |
| $H_2/C_2$, mol % | — | 0.505 |
| $C_2/C_2 + C_3$, mol % | — | 0.041 |
| $C_4/C_4 + C_3$, mol % | 0.214 | — |

TABLE 1B

| | Examples | |
|---|---|---|
| | 1 | 2 |
| Fraction (A), wt % | 52 | 45.1 |
| Fraction (B), wt % | 48 | 54.9 |
| Ethylene in (B), wt. % | 2.5 | 3.8 |
| Butene-1 in (A), wt % | 14.2 | 15.3 |
| Butene-1 in (B), wt % | 3.6 | — |
| Melting point* | — | 132.8 |
| MIL*, g/10 min. | 1.65 | 6.07 |
| I.V.*, dl/g | 2.31 | 1.69 |
| Xylene solubles at 25° C., wt %* | 15.72 | 11.72 |
| I.V. of xylene solubles, dl/g | 1.78 | 1.02 |
| Hexene solubles at 50° C., wt %* | 3 | 5 |
| Yield $\frac{g\ polymer}{g\ catalyst\ component}$ * | 6,500 | 20,000 |

*on the final propylene polymer composition

The seal initiation temperature (S.I.T.) of the propylene polymer compositions of examples of 1 and 2 is determined by extruding said compositions at about 200° C. into films 50 microns thick. Each of the resulting films is laid on a 560 micron thick film layer of polypropylene having an isotacticity index of 97 and a melt index of 4.5 g/10 min. A plate press at 200° C. and at a pressure of 9000 kg. is placed on top of the superimposed film layers for 5 minutes to form a laminate of the two film layers. The resulting laminate is stretched 6 times its height in the machine and cross directions using a TM Long film stretcher, thereby obtaining a laminated film about 20 microns thick. From these biaxially oriented laminated films, 5×10 cm test pieces are cut. Two of the above described test pieces for each composition are superimposed with the layers made of the propylene polymer composition of examples 1 or 2, as the case may be, facing each other. The superimposed films are then sealed along the 5 cm long side with a Sentinel Combination Laboratory sealer, Model 12-12AS. The measurements are made by applying a load of 300 g to heat sealed samples for 5 seconds at a pressure of 1.2 atm. and at a weld width of 2.5 cm. The actual temperature of each sample to be measured is increased by 2° C. The samples having the best seals or welds are then cut to obtain 2.5×10 cm. strips and the unsealed ends of the samples are hooked to a dynamometer. The S.I.T. is that temperature at which the seal or weld does not break when the 300 g load is applied as described above.

The S.I.T. for the propylene polymer compositions of examples 1 and 2 were of 100 and 105° C., respectively.

EXAMPLE 3

This example illustrates an air quenched blown film material comprising the propylene polymer composition and a method for preparing the same.

An air quenched blown film of the propylene polymer composition of Example 2, stabilized with 0.025 parts per hundred parts of the propylene polymer composition (pph) octadecyl-3,5-bis(1,1-dimethylethyl)-4-hydroxybenzene propanoate, 0.075 pph tetrakis[methylene(3,5-di-tert-butyl-4-hydroxyhydrocinnamate)] methane, 0.08 pph Sandostab P-EPQ composition, the main component of which is tetrakis(2,4-di-tert-butylphenyl)-4-4'-biphenylene diphosphonite and 0.05 calcium stearate and to which 0.15 pph Millad 3905 nucleator was also added, is prepared by charging the composition into a single screw extruder, extruding it through a circular die and blowing it into a film form with a sufficient amount of air to provide a film of 1 mil thickness using the following equipment and processing conditions:
Screw:

Compression ratio 3:1 to 4:1.

Polyolefin barrier type L/D ratio =24:1 to 30:1.

Blow up ratio =2.5 to 4.1.

Die gap: 40 mils for a thickness of 0.5 to 5 mils.
Extruder barrel profile:

380° to 430° F. going from zone 1 to zone 6.
Adapter and die temperatures:

450° F. except upper and lower die zones which are 460° F.
Screw speed:

20 rpm.
Pressure:

3000 psi.

The properties of the resulting film are set forth in Table 2 below.

TABLE 2

| Properties | Resins | | |
|---|---|---|---|
| | Example 2 | HDPE[1] | LLDPE[2] |
| Yield Strength (MD/CD[3]), psi | 3432/3461 | 3757/3145 | 1749/1739 |
| Break Strength (MD/CD), psi | 3432/3461 | 3960/3216 | 2092/1898 |
| Elongation at yield (MD/CD), % | 11/12 | 30/7 | 80/17 |
| Elongation at break (MD/CD), % | 112/172 | 120/350 | 317/425 |
| Elemendorf tear, (MD/CD), g/ply | 8/10 | 10/282 | 350/790 |
| Trouser tear, (MD/CD) | 206/320 | 147/1026 | 503/758 |
| Haze | 4.8 | 76.8 | 8.7 |
| Gloss | 72 | 10 | 70 |
| Coefficient of friction (static/kinetic) | 1.08/0.70 | 0.241/0.192 | 0.688/0.650 |

TABLE 2-continued

| Properties | Resins | | |
|---|---|---|---|
| | Example 2 | HDPE[1] | LLDPE[2] |
| Moisture vapor transmission rates at 100° F. & 100 relative humidity, g/100 sq. in/24 hrs. | 0.987 | 1.300 | — |
| Dart impact strength, ft-lb/mil | 0.150 | 0.720 | 1.020 |

[1]Quantum LR 732 HDPE having a density of 0.953 g/cc$^3$.
[2]Dowlex 2045 LLDPE containing hexene-1 and having a density of 0.920 g/cc$^3$.
[3]MD/CD = machine direction/cross direction.

From Table 2 one can see that the propylene polymer composition of this invention provides an air quenched blown film with less haze, better gloss, improved moisture barrier properties and a better overall balance of properties. Further, it should be noted that propylene polymer materials, the major portion of which comprise propylene units, generally do not run well, if at all, on air quenched blown film equipment.

EXAMPLE 4

This example illustrates a cast film material comprising the propylene polymer composition and a coextruded film of the propylene polymer composition and a homopolymer of propylene and a method for preparing same.

A cast film of the propylene polymer composition of Example 2 stabilized as set forth in Example 3 absent the Millad 3905 nucleator, and a cast film of the same stabilized propylene polymer composition to which 0.15 pph Millad 3905 nucleator (N) is added are prepared by charging each composition into an extruder, extruding it through a flat film die and quenching onto a chill roll to produce a film of 1 mil thickness using the following equipment and processing conditions:
Screw design:

Compression ratio: 4:1 to 3:1

Feed zone depth: 0.435 to 0.490" (3.5" extruder with 3.5:1 compression ratio)

Metering zone depth: 0.125 to 0.140" for 3.5" extruder
Die: Convention center-fed coathanger manifold.
Extruder operating conditions:

Melt temperature: 430°–500° F.

Extruder Barrel: 350°–420° F. going from zone 1 to zone 6.

Adapter and die temperatures: 420° F.

A coextruded film 1.25 mils thick of the propylene polymer composition of Example 2 stabilized as set forth in Example 3 absent the Millad 3905 nucleator, and Pro-Fax PC 942 homopolymer of propylene having a melt flow rate (MFR) of 6.0 dg/min is prepared by the cast film technique.

The properties of the resulting film are set forth in Table 3 below.

TABLE 3

| Properties | Resins | | | |
|---|---|---|---|---|
| | Ex. 2 | Ex. 2 + N | Coex[1] | P-E Co[2] |
| Yield Strength (MD/CD[3]), psi | 2234/2121 | 3010/2837 | 2785/2635 | 2523/2452 |
| Break Strength (MD/CD), psi | 6902/3387 | 6442/6317 | 5254/3520 | 4120/3363 |
| Elongation at yield (MD/CD), % | 16/13 | 16/17 | 10/9 | 15/10 |
| Elongation at break (MD/CD), % | 571/595 | 520/523 | 522/590 | 522/584 |
| Elemendorf tear, (MD/CD), g/ply | 44/1019 | 19/985 | 51/132 | 49/102 |
| Haze | 1.3 | 3.2 | 2.8 | 2.3 |
| Gloss | 86.7 | 80.4 | 85.0 | 78.1 |
| Coefficient of friction (static/kinetic) | No slide | 1.44/1.03 | 0.463/0.30 | 0.291/0.213 |
| Moisture vapor transmission rates at 23° C. & 90 relative humidity, g/100 sq. in/24 hrs. | 0.226 | 0.200 | 0.152 | 0.207 |
| As above at 37.8° C. | 0.923 | 0.887 | 0.682 | 0.923 |

[1]Propylene polymer composition of Ex. 2/homopolymer of propylene/propylene polymer composition of Ex. 2.
[2]Propylene-ethylene random copolymer with an ethylene content of 3.0%.
[3]MD/CD = machine direction/cross direction.

From Table 3 one can see that the propylene polymer composition of this invention provides a cast film with superior break strength, improved elongation at yield, less haze in the absence of a nucleator, improved moisture barrier properties and a better overall balance of properties.

EXAMPLE 5

This example illustrates a biaxially oriented film material comprising the propylene polymer composition and a coextruded film of the propylene polymer composition and a homopolymer of propylene and a method for preparing same.

A biaxially oriented film of the propylene polymer composition of Example 2 stabilized as set forth in Example 3 absent the Millad 3905 nucleator is prepared by charging the composition into an extruder, extruding it through a slot die and quenching the thus formed sheet. The sheet is then oriented in the longitudinal direction between rolls running at different speeds and then passing it into a tenter frame for orientation in a lateral direction by means of diverging chains of clips. After the biaxial orientation is complete, the orientation is locked into the film by cooling. The resulting film is 1 mil thick. The following equipment and processing conditions are used:

| Extrusion profile: | Zone 1 | 410° F. |
|---|---|---|
| | Zone 2 | 420° F. |
| | Zone 3 | 430° F. |
| | Filter | 430° F. |
| | Adapters 1 & 2 | 430° F. |
| | Die Zone 1 | 440° F. |
| | Zones 2 & 3 | 440° F. |
| | Chill Roll | 86° F. |
| | MDO Zone 1 | 145° F. |
| | MDO Zone 8 | 190° F. |
| TDO: | Zones 1 & 2 | 290° F. |
| | Zone 3 | 266° F. |
| | Zone 4 | 230° F. |
| | Zones 5 & 6 | 145° F. |
| Screw speed: | 160 rpm. | |
| Line speed: | 40 meters/min | |

A coextruded film 1.25 mils thick of the propylene polymer composition of Example 2 stabilized as set forth in Example 3 absent the Millad 3905 nucleator and Moplen S38F homopolymer of propyleve having a MFR of 2.0 dg/min is prepared by extruding the three layer laminate and biaxially orienting as set forth above.

The properties of the resulting film are set forth in Table 4 below.

TABLE 4

| Properties | Resins | | |
|---|---|---|---|
| | Example 2 | Coex[1] | PP[2] |
| Yield Strength (MD/CD[3]), psi | 9860/5914 | 20109/6886 | 22000/10000 |
| Break Strength (MD/CD), psi | 9680/5874 | 20109/5885 | 22000/10000 |
| Elongation at yield (MD/CD), % | 6/25 | 11/16 | 7/30 |
| Elongation at break (MD/CD), % | 6/25 | 11/16 | 7/30 |
| Elemendorf tear, (MD/CD), g/ply | 7/5 | 5/5 | 4/5 |
| Haze | 0.1 | 1.0 | 1.0 |
| Gloss | 95 | 90 | 85 |
| Coefficient of friction (static/kinetic) | No slide | 1.4/0.88 | — |
| Moisture vapor transmission rates at 100° F. & 100 relative humidity, g/100 sq. in/24 hrs. | 0.580 | 0.355 | 0.40 |
| Dart impact strength, ft-lb/mil | 2.90 | 4.12 | — |

TABLE 4-continued

| | Resins | | |
|---|---|---|---|
| Properties | Example 2 | Coex[1] | PP[2] |
| Shrinkage (MD/CD), % | | | |
| at 100° C. | 20/32 | 3/3 | — |
| at 120° C. | 60/75 | 8/12 | — |

[1]Propylene polymer composition of Ex. 2/homopolymer of propylene/propylene polymer composition of Ex. 2, which coextruded film has a S.I.T. of 105° C.
[2]Moplen S38F homopolymer of propylene having a MFR of 2.0 dg/min and a S.I.T. of about 163° C.

From Table 4 one can see that the propylene polymer composition of this invention provides a biaxially oriented film with superior S.I.T., improved Elemendorf tear properties, less haze and superior gloss and a better overall balance of properties.

Various types of film materials of conventional thickness and thin films less than 20 mils thick to as thin as about 0.5 mils can be prepared using the propylene polymer composition described herein as well as heavy film materials, typically referred to as sheets, from 20 to 100 mils thick. For example, in addition to the films exemplified herein, it can be used to make uniaxially oriented films and extruded or calendared sheets. In addition, a layer comprising the propylene polymer composition can be applied to, e.g. by lamination or coextrusion techniques, at least one surface of a thermoplastic film material or a metallic sheet or foil substrate. Typical thermoplastic materials include crystalline homopolymers of a $C_{2-10}$ alpha-olefin monomer, such as propylene or ethylene, or copolymers of propylene with ethylene and/or a $C_{4-10}$ alpha-olefin-monomers, provided that, when the alpha-olefin is ethylene, the maximum polymerized ethylene content is about 10%, preferably about 4%, and when the alpha-olefin is a $C_{4-10}$ olefin, the maximum polymerized content thereof is about 20%, preferably about 16%, as well as polyesters, polyamides, ethylene-vinyl alcohol copolymers and ethylene-vinyl acetate copolymers. Aluminum is a suitable metallic substrate.

In addition, film materials can be prepared from blends of from about 5 to 45% of the propylene polymer composition described herein with from about 95 to 55% of a crystalline homopolymer of a $C_{2-10}$ alpha-olefin monomer or copolymer of propylene with ethylene and/or a $C_{4-10}$ alpha-olefin monomer as described in the preceding paragraph. Preferably the amount of the propylene polymer composition present in such blends is from 10 to 30%.

The propylene polymer composition of this invention is such that one can achieve the proper balance of properties ill the resulting product when a film layer of same is the material applied to at least one surface of another thermoplastic material or to a metallic substrate and when it is blended with another thermoplastic material and the blend is used to make film materials.

The films of the propylene polymer composition and film laminates having at least one layer thereof as well as the films prepared from blends thereof with other thermoplastic materials can be used in packaging applications, in the production of containers for chemicals and hazardous waste and in medical applications.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A film or sheet material of a crystalline propylene polymer composition which consists essentially of, by weight,
   (A) from about 30 to 65% of a copolymer of propylene with a $C_{4-8}$ alpha-olefin containing from 80 to 98% propylene, and
   (B) from 35 to 70% of a copolymer consisting of propylene with ethylene having an ethylene content of 5 to 10%, which composition is prepared by sequential polymerization and wherein a laminate of a polypropylene film and of said film or sheet material has a seal initiation temperature from 100 to 110° C.

2. The material of claim 1 wherein (A) is a copolymer of propylene and butene-1.

3. The material of claim 1 wherein (A) is present in an amount of from 35 to 65%, and (B) is present in an amount of from 35 to 65%, by weight.

4. The material of claim 1 wherein (A) is present in an amount of from 45 to 65%, and (B) is present in an amount of from 35 to 55%, by weight.

5. A film or sheet article comprising a base film or sheet of a crystalline homopolymer of a $C_{2-10}$ alpha-olefin monomer or of a copolymer of propylene with ethylene or of a copolymer of propylene with a $C_{4-10}$ alpha-olefin monomer, or of a copolymer of propylene with ethylene and a alpha-olefin, provided that, when said copolymer is a copolymer with ethylene, the maximum polymerized ethylene content is about 10%, and when said copolymer is a copolymer with a $C_{4-10}$ alpha-olefin, the maximum polymerized content thereof is about 20%, and applied to at least one surface of the base film or sheet, a layer of the material of claim 1.

6. A film or sheet article comprising a base film or sheet of a crystalline homopolymer of a $C_{2-10}$ alpha-olefin monomer or of a copolymer of propylene with ethylene or of a copolymer of propylene with a $C_{4-10}$ alpha-olefin monomer, or of a copolymer of propylene with ethylene and a $C_{4-10}$ alpha-olefin, provided that, when said copolymer is a copolymer with ethylene, the maximum polymerized ethylene content is about 10%, and when said copolymer is a copolymer with a $C_{4-10}$ alpha-olefin, the maximum polymerized content thereof is about 20%, and applied to at least one surface of the base film or sheet, a layer of the material of claim 2.

7. A film or sheet article comprising a base film or sheet of a crystalline homopolymer of a $C_{2-10}$ alpha-olefin monomer or of a copolymer of propylene with ethylene or of a copolymer of propylene with a $C_{4-10}$ alpha-olefin monomer, or of a copolymer of propylene with ethylene and a $C_{4-10}$ alpha-olefin, provided that, when said copolymer is a copolymer with ethylene, the maximum polymerized ethylene content is about 10%, and when said copolymer is a copolymer with a $C_{4-10}$ alpha-olefin, the maximum polymerized content thereof is about 20%, and applied to at least one surface of the base film or sheet, a layer of the material of claim 3.

8. A film or sheet article comprising a base film or sheet of a metallic substrate having applied to at least one surface thereof a layer of the material of claim 1.

9. A film or sheet article comprising a base film or sheet of a metallic substrate having applied to at least one surface thereof a layer of the material of claim 2.

10. A film or sheet article comprising a base film or sheet of a metallic substrate having applied to at least one surface thereof a layer of the material of claim 3.

11. A film or sheet material comprising a blend of (1) from about 5 to 45% of a crystalline propylene polymer composition of claim 1; and (2) from about 95 to 55% of a crystalline homopolymer of a $C_{2-10}$ alpha-olefin monomer or of a copolymer of propylene with ethylene or of a copolymer of propylene with a $C_{4-10}$ alpha-olefin monomer, provided that, when said copolymer is a copolymer with ethylene, the maximum polymerized ethylene content thereof is about 10%, and when said copolymer is a copolymer with a $C_{4-10}$ alpha-olefin, the maximum polymerized content thereof is about 20%.

12. The material of claim 11 wherein (1)(A) is a copolymer of propylene and butene-1.

13. The material of claim 12 wherein (1) is present in an amount from 10 to 30%.

14. A film or sheet material of a crystalline propylene polymer composition which consists essentially of, by weight:

(A) from 45 to 65% of a copolymer of propylene with a $C_{4-8}$ alpha-olefin containing from 80 to 98% propylene, and (B) from 35 to 55% of a terpolymer of propylene with ethylene and a $C_{4-8}$ alpha-olefin having an ethylene content of 0.5 to 5%, a $C_{4-8}$ alpha-olefin content of 1 to 9.5%, wherein the total content of ethylene and $C_{4-8}$ alpha-olefin is from 2 to 10%, which composition is prepared by sequential polymerization and wherein a laminate of a polypropylene film and of said film or sheet material has a seal initiation temperature from 100 to 110° C.

15. The material of claim 14 wherein (B) is a terpolymer of propylene, ethylene and butene-1.

16. The material of claim 15 wherein (A) is a copolymer of propylene and butene-1.

17. A film or sheet material comprising a blend of (1) from about 5 to 45% of a crystalline propylene polymer composition of claim 14; and (2) from about 95 to 55% of a crystalline homopolymer of a $C_{2-10}$ alpha-olefin monomer or of a copolymer of propylene with ethylene or of a copolymer of propylene with a $C_{4-10}$ alpha-olefin monomer or of a copolymer of propylene with ethylene and $C_{4-10}$ alpha-olefin, provided that, when said copolymer is a copolymer with ethylene, the maximum polymerized ethylene content thereof is about 10%, and when said copolymer is a copolymer with a $C_{4-10}$ alpha-olefin, the maximum polymerized content thereof is about 20%.

18. A film or sheet material comprising a blend of (1) from about 5 to 45% of a crystalline propylene polymer composition of claim 16; and (2) from about 95 to 55% of a crystalline homopolymer of a $C_{2-10}$ alpha-olefin monomer or of a copolymer of propylene with ethylene or of a copolymer of propylene with a $C_{4-10}$ alpha-olefin monomer or of a copolymer of propylene with ethylene and $C_{4-10}$ alpha-olefin, provided that, when said copolymer is a copolymer with ethylene, the maximum polymerized ethylene content thereof is about 10%, and when said copolymer is a copolymer with a $C_{4-10}$ alpha-olefin, the maximum polymerized content thereof is about 20%.

19. A film or sheet article comprising a base film or sheet of a crystalline homopolymer of a $C_{2-10}$ alpha-olefin monomer or of a copolymer of propylene with ethylene or of a copolymer of propylene with a $C_{4-10}$ alpha-olefin monomer, or of a copolymer of propylene with ethylene and a $C_{4-10}$ alpha-olefin, provided that, when said copolymer is a copolymer with ethylene, the maximum polymerized ethylene content is about 10%, and when said copolymer is a copolymer with a $C_{4-10}$ alpha-olefin, the maximum polymerized content thereof is about 20%, and applied to at least one surface of the base film or sheet, a layer of the material of claim 14.

20. A film or sheet article comprising a base film or sheet of a metallic substrate having applied to at least one surface thereof a layer of the material of claim 14.

* * * * *

UNITED STATES PATENT AND TRADEMARK OFFICE
CERTIFICATE OF CORRECTION

PATENT NO. : 5,538,804
DATED : July 23, 1996
INVENTOR(S) : Kumar Ogale

It is certified that error appears in the above-indentified patent and that said Letters Patent is hereby corrected as shown below:

At col. 10, line 48, delete --4-- after "extruder".

At col. 13, line 52, change "ill" to --in--.

At col. 14, line 15, after "polymerization" insert --and has a xylene soluble polymer fraction at ambient temperature of less than 15%--.

At col. 14, line 29, insert --$C_{4-10}$-- before "alpha".

At col. 15, line 29, after "polymerization" insert --and has a xylene soluble polymer fraction at ambient temperature of less than 15%--.

Signed and Sealed this

Third Day of December, 1996

BRUCE LEHMAN

Attest:

Attesting Officer

Commissioner of Patents and Trademarks